United States Patent
Maji

(10) Patent No.: US 10,993,422 B1
(45) Date of Patent: May 4, 2021

(54) FISHING LURE, FISHING LURE FABRICATION METHOD, AND FISHING METHOD

(71) Applicant: KEITECH Inc., Fujikawaguchiko-machi (JP)

(72) Inventor: Hisashi Maji, Fujikawaguchiko-machi (JP)

(73) Assignee: Keitech Inc.

( * ) Notice: Subject to any disclaimer, the term of this patent is extended or adjusted under 35 U.S.C. 154(b) by 0 days.

(21) Appl. No.: 16/850,221

(22) Filed: Apr. 16, 2020

Related U.S. Application Data

(63) Continuation of application No. PCT/JP2020/008396, filed on Feb. 28, 2020.

(51) Int. Cl.
*A01K 85/08* (2006.01)
*A01K 85/01* (2006.01)

(52) U.S. Cl.
CPC .............. *A01K 85/01* (2013.01); *A01K 85/08* (2013.01)

(58) Field of Classification Search
CPC ........ A01K 85/00; A01K 85/10; A01K 85/02; A01K 85/12; A01K 85/14; A01K 85/08
See application file for complete search history.

(56) References Cited

U.S. PATENT DOCUMENTS

| | | | | |
|---|---|---|---|---|
| 2,756,532 A | * | 7/1956 | Trester ................... | A01K 85/08 43/42.05 |
| 4,718,191 A | * | 1/1988 | Gentry ................... | A01K 85/00 43/42.11 |
| 4,773,180 A | * | 9/1988 | Shimizu ................. | A01K 85/00 43/42.11 |
| 5,024,019 A | | 6/1991 | Rust et al. | |
| 5,605,004 A | * | 2/1997 | Boullt .................... | A01K 85/00 43/42.13 |
| 6,266,914 B1 | * | 7/2001 | Johnson ................. | A01K 85/00 43/42.13 |
| 6,796,080 B1 | * | 9/2004 | Mathews, Jr. ......... | A01K 85/00 43/42.11 |

(Continued)

FOREIGN PATENT DOCUMENTS

| | | |
|---|---|---|
| JP | 2016-082904 | 5/2016 |
| JP | 2018186738 | 11/2018 |

OTHER PUBLICATIONS

Office Action dated May 21, 2020, issued in Japanese Patent Application No. 2020-513925, 6 pages.

(Continued)

*Primary Examiner* — Thanh Pham
(74) *Attorney, Agent, or Firm* — Grossman Tucker; Perreault & Pfleger PLLC

(57) ABSTRACT

Fishing lures that can mimic the movement of a fish or crustacean are described. The fishing lures can generate a vibrating action in water and can avoid snagging. In embodiments the fishing lures include a wire section, a blade section, and a main body section. The wire section that extends through one of a plurality of holes in the blade section to a side that faces the main body section. The wire section includes a bent portion, and the wire section extends from the bent portion through another of the plurality of holes of the blade section to the side that faces the main body section. When the fishing lure is pulled forward through water the blade section vibrates around the wire section.

25 Claims, 14 Drawing Sheets

(56) References Cited

U.S. PATENT DOCUMENTS

| | | | |
|---|---|---|---|
| 7,627,978 B2 | 12/2009 | Davis | |
| 7,726,062 B2 | 6/2010 | Davis | |
| 9,003,690 B1* | 4/2015 | Rye | A01K 85/10 43/42.74 |
| 9,253,967 B2 | 2/2016 | Davis | |
| 2005/0005498 A1* | 1/2005 | Fasnacht | A01K 85/00 43/13 |
| 2009/0145017 A1* | 6/2009 | Richey | A01K 85/08 43/43.14 |
| 2015/0007483 A1* | 1/2015 | Thorne | A01K 85/00 43/42.03 |
| 2016/0235049 A1* | 8/2016 | Thorne | A01K 85/14 |
| 2017/0099822 A1* | 4/2017 | Thorne | A01K 85/00 |

OTHER PUBLICATIONS

Office Action dated Sep. 15, 2020, issued in Japanese Patent Application No. 2020-513925, 5 pages.

* cited by examiner

FISHING LURE, FISHING LURE FABRICATION METHOD, AND FISHING METHOD

TECHNICAL FIELD

The present invention relates to a fishing lure.

BACKGROUND

There have been developed a fishing lure configured to prevent a hook from being caught by an obstacle in water (for example, fresh water, sea water) during fishing and a fishing lure configured to move by copying the movement of a fish or a crustacean such as a shrimp which constitutes a bait.

Patent Literature 1 (U.S. Pat. No. 9,253,967) discloses a fishing lure in which the lure is prevented from rolling by restricting a side-to-side movement of a blade so as to prevent a hook from being directed downwards whereby the hook is prevented from being caught by an obstacle in water, and the restricted side-to-side movement of the blade generates a quick and controlled vibrating action of the blade so as to copy the movement of a fish or a crustacean such as a shrimp which constitutes a bait.

Patent Literature 2 (Japanese Patent Publication No. JP-A-2016082904) discloses a fishing lure in which a lure main body is caused to move so as to obtain a high fish collecting effect, and a lure 1 includes a lure main body 2 and a blade 3. A split ring 5 is coupled to a blade eye 27. The blade 3 is restricted from rotating relative to the lure main body 2 by coupling the blade 3 to the blade eye 27 via the split ring 5, thereby allowing the lure main body 2 to move.

CITATION LIST

Patent Literatures

PATENT LITERATURE 1: U.S. Pat. No. 9,253,967 Specification; PATENT LITERATURE 2: JP-A-2016-82904

SUMMARY OF INVENTION

Technical Problem

In the invention of Patent Literature 1, however, when a fishing line is not pulled in water, the blade descends to a lower side of the lure, and the blade does not vibrate. In addition, in the invention of Patent Literature 2, a hook cannot be prevented from being caught by an obstacle in water.

Solution to Problem

An object of the invention of this patent application is to solve the problems inherent in Patent Literature 1 and Patent Literature 2.

According to a first invention, there is provided a fishing lure including a hook section including a shaft having a first width, a main body section having a second width, a front portion, a rear portion, and a longitudinal shaft, a wire section extending from the front portion of the main body section, and a blade section having a first distal end portion disposed close to the front portion of the main body section, a first side portion, a second side portion, and a plurality of holes through which the wire section penetrates, wherein the hook section extends from the rear portion of the main body section, wherein the wire section penetrates through one of the plurality of holes in the blade section to extend to an opposite side of the blade section to a side thereof which faces the main body section, includes a bent portion which is bent at a portion along an extension of the wire section, and penetrates through another hole of the plurality of holes in the blade section to extend from the bent portion further to the side of the blade section which faces the main body section, wherein most of the blade section is situated above the main body section, and wherein when the fishing lure is pulled to a front in water (for example, fresh water, sea water), the blade section vibrates around the wire section in such a manner that the first side portion and the second side portion of the blade section move alternately towards the main body section, and a vibrating action of the blade section is restricted by the wire section and as a result of a portion of the blade section lying close to the first distal end portion thereof coming into collision with the front portion of the main body section. As a result, the fishing lure is prevented from rolling, which prevents the hook section from being directed downwards, whereby the hook section is prevented from being caught by an obstacle in water (for example, fresh water, sea water), and the restricted alternate vibrating actions of the first end portion and the second end portion of the blade section towards the main body section generates a quick and controlled vibrating action of the blade section, allowing the blade section to move while copying the movement of a fish or a crustacean such as a shrimp which constitutes a bait, whereby a fish collecting effect is provided. Further, since most of the blade section is situated above the main body section at all times, the alternate vibrating actions of the first end portion and the second end portion of the blade section towards the main body section are still generated towards the main body section even though the pulling on the fishing line is mitigated, and when the lure falls in water (for example, fresh water, sea water), the lure falls while oscillating left and right, whereby a fish collecting effect can be expected.

According to a second invention, the fishing lure includes a skirt section which is wound around the main body section. As a result, the fishing lure can copy a fish or a crustacean such as a shrimp which constitutes a bait more precisely.

According a third invention, a fishing line is configured to be attached to the bent portion of the wire section. As a result, the fishing line can easily be attached to the fishing lure.

According to a fourth invention, the blade section includes a second distal end portion which is situated opposite to the first distal end portion, and a width of the first distal end portion is smaller than a width of the second distal end portion. As a result, a movement suitable for a specific fish can be given to the lure.

According to a fifth invention, the blade section includes a second distal end portion which is situated opposite to the first distal end portion, and a width of the first distal end portion is greater than a width of the second distal end portion. As a result, a movement suitable for a specific fish can be given to the lure.

According to a sixth invention, the shaft of the hook section extends from the rear portion of the main body section along the longitudinal shaft of the main body section. As a result, the lure having a good balance can be provided.

According to a seventh invention, the wire section extends from the front portion of the main body section to the front along the longitudinal shaft of the main body section. As a result, the lure having a good balance can be provided.

According to an eighth invention, the wire section which extends along the longitudinal shaft of the main body section is inclined relative to the longitudinal shaft. As a result, a height of the blade section in a vertical direction to the longitudinal shaft of the main body section is higher than a height of the hook section, whereby not only can the hook section be prevented further from being caught by the obstacle, but also the fishing lure having good efficiency can be provided. That is, the blade section can be moved longitudinally and laterally in an effective fashion, as a result of which the fishing lure can be moved slowly or quickly with no such situation that the fishing lure does not rotate and/or vibrate.

According to a ninth invention, the wire section is tapered so that a diameter of a portion situated close to the front portion of the main body section is greater than a diameter of a portion close to the bent portion. As a result, the fishing lure can be provided in which even though a big fish is hooked on the fishing lure in water, the wire section is hardly deformed by the weight of the fish.

According to a tenth invention, the wire section passes through an interior of a cylindrical member which extends from the front portion of the main body section to a vicinity of the bent portion. As a result, the fishing lure can be provided in which even though a big fish is hooked on the fishing lure in water, the wire section is hardly deformed by the weight of the fish.

According to an eleventh invention, the wire section, which extends from the bent portion through the other hole of the plurality of holes to the side of the blade section which faces the main body section, is tapered so that the diameter of the portion situated close to the bent portion is greater than a diameter of a portion extending towards the side of the blade section which faces the main body section. As a result, the fishing lure can be provided in which even though a big fish is hooked on the fishing lure in water, the wire section is hardly deformed by the weight of the fish.

According to a twelfth invention, the wire section comprises a substantially spherical bead at a portion along an extension thereof to the side of the blade section which faces the main body section after the wire section passes through the other hole of the plurality of holes in the blade section from the bent portion, the bead having a through hole through which the wire section penetrates for extension. As a result, not only can the wire section be prevented from falling off the blade section, but also the fish collecting effect can be enhanced by propagation of a sound wave generated by the collision of the bead with the blade section and/or the wire section.

According to a thirteenth invention, the vibrating action of the blade section generates a propagation of sound wave in water. As a result, the fish collecting effect can be enhanced.

According to a fourteenth invention, there is provided a fishing lure fabrication method including a step of providing a main body section including a front portion, a rear portion, and a longitudinal shaft, the main body section including a wire section extending from the front portion of the main body section along the longitudinal shaft and a hook section having a shaft section extending from the rear portion of the main body section along the longitudinal shaft, the main body section being fixed firmly around the wire section and the hook section which both extend along the longitudinal shaft of the main body section, a step of providing a blade section comprising a first distal end portion disposed close to the front portion of the main body section, a first side portion, a second side portion, and a plurality of holes through which the wire section penetrates, and a step in which the wire section penetrates through one of the plurality of holes in the blade section to extend to an opposite side of the blade section to a side thereof which faces the main body section, includes a bent portion which is bent at a portion along an extension of the wire section, and penetrates through another hole of the plurality of holes in the blade section from the bent portion to extend further to the side of the blade section which faces the main body section, and most of the blade section is situated above the main body section, wherein when the fishing lure is pulled to a front in water, the blade section vibrates around the wire section in such a manner that the first side portion and the second side portion of the blade section move alternately towards the main body section, and a vibrating action of the blade section is restricted by the wire section and as a result of a portion of the blade section lying close to the first distal end portion thereof coming into collision with the front portion of the main body section. As a result, the fishing lure can be provided in which the fishing lure is prevented from rolling, which prevents the hook section from being directed downwards, whereby the hook section is prevented from being caught by an obstacle in water (for example, fresh water, sea water), and the restricted alternate actions of the first end portion and the second end portion of the blade section towards the main body section generates a quick and controlled vibrating action of the blade section, allowing the blade section to move while copying the movement of a fish or a crustacean such as a shrimp which constitutes a bait, whereby a fish collecting effect is provided. Further, the fishing lure can be provided in which since most of the blade section is situated above the main body section at all times, the alternate actions of the first end portion and the second end portion of the blade section towards the main body section are still generated towards the main body section even though the pulling on the fishing line is mitigated, and when the lure falls in water (for example, fresh water, sea water), the lure falls while oscillating left and right, whereby a fish collecting effect can be expected.

According to a fifteenth invention, the method includes a step of attaching a skirt section to the main body section. As a result, the fishing lure can be provided in which the fish collecting effect can be enhanced further.

According to a sixteenth invention, the blade section includes the blade section comprises a second distal end portion which is situated opposite to the first distal end portion, and a width of the first distal end portion is smaller than a width of the second distal end portion. As a result, a movement suitable for a specific fish can be given to the lure.

According to a seventeenth invention, the blade section includes a second distal end portion which is situated opposite to the first distal end portion, and a width of the first distal end portion is greater than a width of the second distal end portion.

According to an eighteenth invention, the shaft of the hook section extends from the rear portion of the main body section to the rear along the longitudinal shaft of the main body section. As a result, the lure having a good balance can be provided.

According to a nineteenth invention, the wire section extends from the front portion of the main body section to the front along the longitudinal shaft of the main body section. As a result, the lure having a good balance can be provided.

According to a twentieth invention, the method includes a step in which the wire section which extends from the front portion of the main body section along the longitudinal shaft is attached in such a manner as to be inclined relative to the longitudinal shaft. As a result, a height of the blade section in a vertical direction to the longitudinal shaft of the main body section is higher than a height of the hook section, whereby not only can the hook section be prevented further from being caught by the obstacle, but also the fishing lure can be provided which is efficient in the movement of the blade section.

According to a twenty-first invention, the wire section is tapered so that a diameter of a portion situated close to the front portion of the main body section is greater than a diameter of a portion close to the bent portion. As a result, the fishing lure can be provided in which even though a big fish is hooked on the fishing lure in water, the wire section is hardly deformed by the weight of the fish.

According to a twenty-second invention, the wire section passes through an interior of a cylindrical member which extends from the front portion of the main body section to a vicinity of the bent portion. As a result, the fishing lure can be provided in which even though a big fish is hooked on the fishing lure in water, the wire section is hardly deformed by the weight of the fish.

According to a twenty-third invention, the wire section, which extends from the bent portion through the other hole of the plurality of holes to the side of the blade section which faces the main body section, is tapered so that the diameter of the portion situated close to the bent portion is greater than a diameter of a portion extending towards the side of the blade section which faces the main body section. As a result, the fishing lure can be provided in which even though a big fish is hooked on the fishing lure in water, the wire section is hardly deformed by the weight of the fish.

According to a twenty-fourth invention, a substantially spherical bead is attached to the wire section at a portion along an extension thereof to the side of the blade section which faces the main body section after the wire section passes through the other hole of the plurality of holes in the blade section from the bent portion, the bead having a through hole through which the wire section penetrates for extension. As a result, not only can the wire section be prevented from falling off the blade section, but also the fish collecting effect can be enhanced by propagation of a sound wave generated by the collision of the bead with the blade section and/or the wire section (as a result of generating metallic clattering or rapping sound in water (for example, fresh water, sea water)). This can provide a fish collecting effect at the time of retrieving (when the fishing line is pulled in) or at the time of falling (when the fishing lure falls into water).

According to a twenty-fifth invention, there is provided a fishing method, including a step of fixing a fishing line to a fishing lure, the fishing lure comprising a hook section comprising a shaft having a first width, a main body section having a second width, a front portion, a rear portion, and a longitudinal shaft, a wire section extending from the front portion of the main body section, and a blade section having a first distal end portion disposed close to the front portion of the main body section, and a plurality of holes through which the wire section penetrates, the hook section extending from the rear portion of the main body section, the wire section penetrating through one of the plurality of holes in the blade section to extend to an opposite side of the blade section to a side thereof which faces the main body section, comprising a bent portion which is bent at a portion along an extension of the wire section, and penetrating through another hole of the plurality of holes in the blade section to extend further from the bent portion to the side of the blade section which faces the main body section, the fishing line being configured to be attached to the bent portion of the wire section, most of the blade section being situated above the main body section, and a step of pulling the fishing line to a front in water, whereby the blade section vibrates around the wire section in such a manner that the first side portion and the second side portion of the blade section move alternately towards the main body section, and a vibrating action of the blade section is restricted by the wire section and as a result of a portion of the blade section lying close to the first distal end portion thereof coming into collision with the front portion of the main body section. As a result, while a fishing lure is operated, the fishing lure is prevented from rolling, which prevents the hook section from being directed downwards in water (for example, fresh water, sea water), whereby the hook section is prevented from being caught by an obstacle, and the restricted side-to-side movement of the blade section generates the quick and controlled vibrating action of the blade section, allowing the blade section to copy the movement of a bait, thereby generate the fish collecting effect. Further, since most of the blade section is above the main body section at all times, the side-to-side movement of the blade towards the main body section is generated even though the pulling on the fishing line is mitigated, and when the fishing lure falls in water (for example, fresh water, sea water), the fishing lure falls while oscillating left and right, whereby the fish collecting effect can be expected.

Advantageous Effects of Invention

The fishing lure is prevented from rolling, which prevents the hook section from being directed downwards in water (for example, fresh water, sea water), whereby the hook section is prevented from being caught by an obstacle, and the restricted side-to-side movement of the blade section generates the quick and controlled vibrating action of the blade section, allowing the blade section to copy the movement of a fish or a crustacean such as a shrimp which constitutes a bait, thereby generating the fish collecting effect. Further, since most of the blade section is situated above the main body section at all times, the side-to-side movement of the blade section towards the main body section is generated even though the pulling on the fishing line is mitigated, and when the fishing lure falls in water (for example, fresh water, sea water), the fishing lure falls while oscillating left and right, whereby the fish collecting effect can be expected.

Further characteristics and advantages of the invention can be understood more clearly from the following description of a preferred and non-limited embodiment of the invention.

BRIEF DESCRIPTION OF DRAWINGS

The following is a brief description of the drawings, in which like reference numerals depict like parts, and in which.

DETAILED DESCRIPTION

Figure 1:
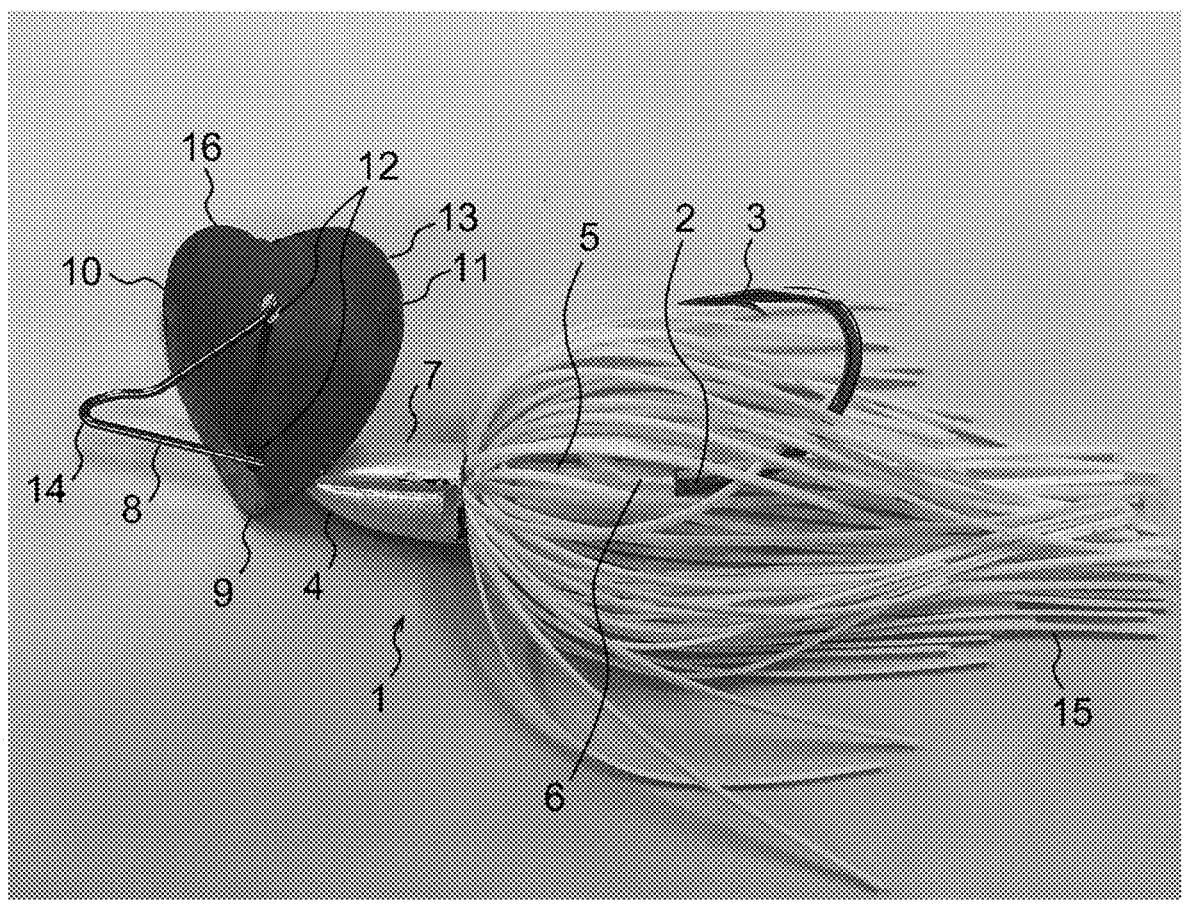
FIG. 1 is a drawing illustrating a fishing lure of an embodiment of the invention of the patent application.
Figure 2:
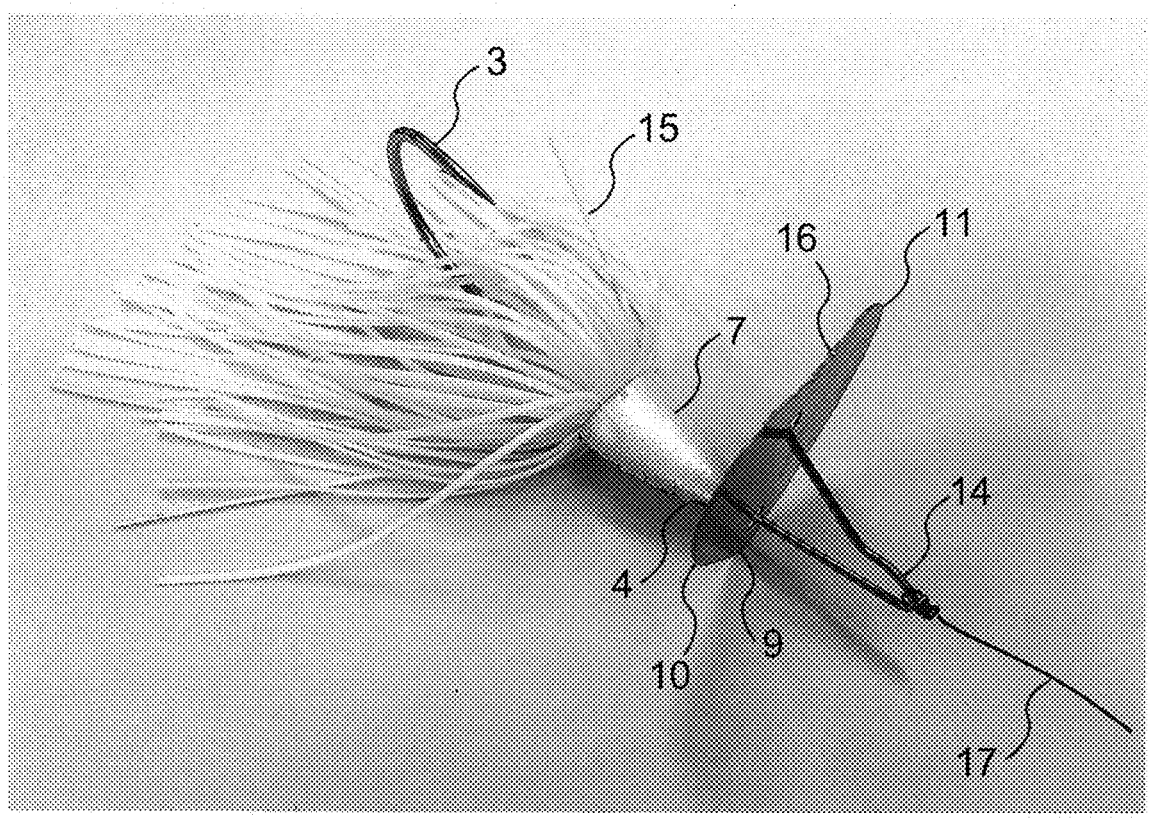
FIG. 2 is a drawing illustrating the fishing lure of the embodiment of the invention of the patent application to which a fishing line is attached.
Figure 3:
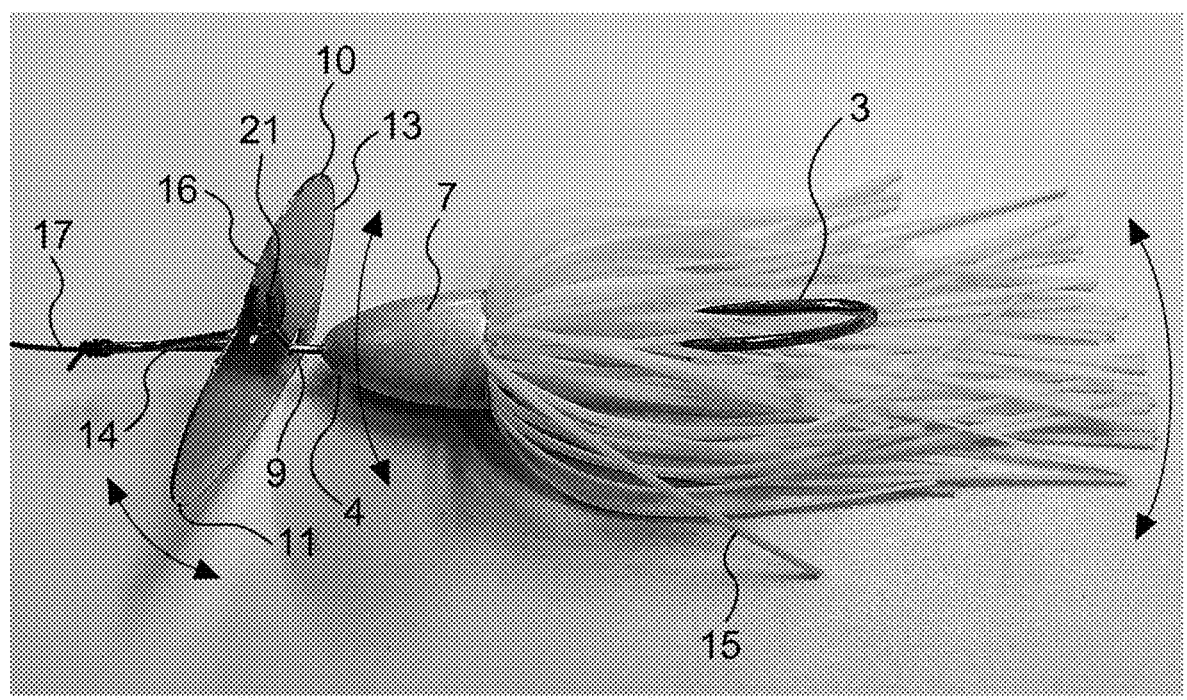
FIG. 3 is a drawing illustrating a moving direction of a blade when the fishing line attached to the fishing lure of the embodiment of the invention of the patent application is pulled and a moving direction of the fishing lure when the fishing lure is moved in association with the movement of the blade section.
Figure 4:
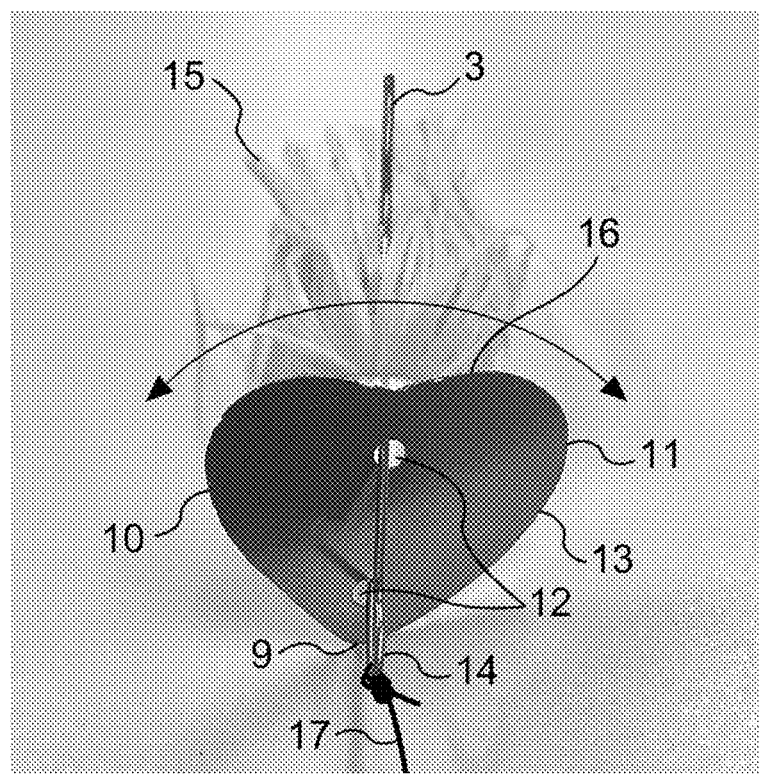
FIG. 4 is a drawing illustrating a moving direction of the blade section when the fishing line attached to the fishing lure of the embodiment of the invention of the patent application is pulled.
Figure 5:
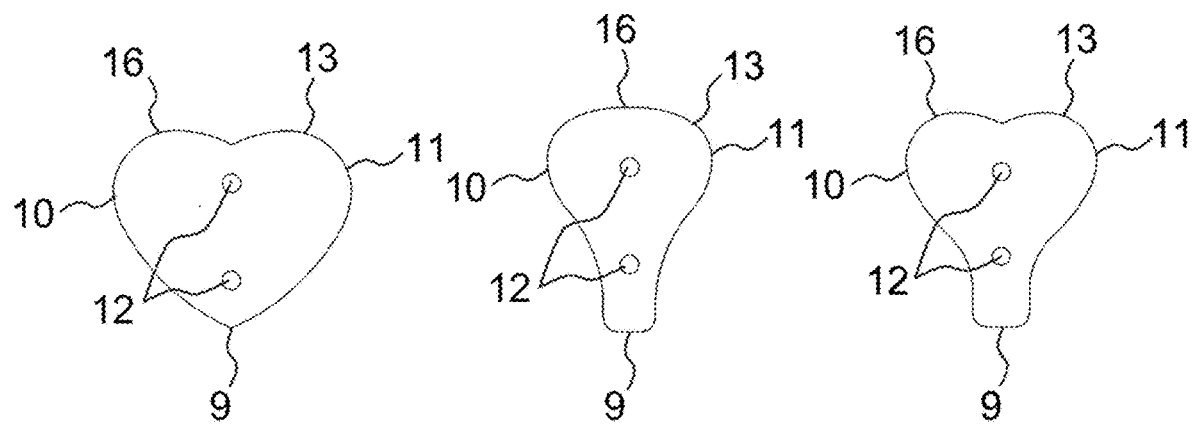
FIG. 5 is a drawing illustrating types in shape of blade sections of the embodiment of the invention of the patent application.

To begin with, referring to FIGS. 1 to 5, FIG. 1 is a drawing illustrating a fishing lure 1 of an embodiment of the invention of the patent application. FIG. 2 is a drawing illustrating the fishing lure 1 of the embodiment of the invention of the patent application in which a fishing line 17 is attached to the fishing lure 1. FIG. 3 is a drawing illustrating a moving direction of a blade section 13 when the fishing line 17 attached to the fishing lure 1 of the embodiment of the invention of the patent application is pulled and a moving direction of a main body section 7 and a skirt section 15 when the main body section 7 and the skirt section 15 move in association with the movement of the blade section 13. FIG. 4 is a drawing illustrating a moving direction of the blade section 13 when the fishing line 17 attached to the fishing lure 1 of the embodiment of the invention of the patent application is pulled. FIG. 5 is a drawing illustrating types of blade sections 13 of the embodiment of the invention of the patent application.

The fishing lure 1 includes a hook section 3 including a shaft 2 having a first width, a main body section 7 having a second width, a front portion 4, a rear portion 6, and a longitudinal shaft 5, a wire section 8 extending from the front portion 4 of the main body section 7, and a blade section 13 having a first distal end portion 9 which is disposed close to the front portion 4 of the main body section 7, a first side portion 10, a second side portion 11, and a plurality of holes 12 through which the wire section 8 penetrates. The first width is smaller than the second width. A head section is made of lead, tin, zinc, or tungsten, and the wire section 8 is made of various metals including stainless steel, aluminum, and titanium alloy. The hook section 3 is made of steel material, and the blade section 13 is made of various metals including stainless steel, aluminum, and titanium alloy or plastic. Thicknesses (Edge thicknesses) of the first side portion 10 and the second side portion 11 of the blade section 13 are, for example, about 0.4 mm to about 0.6 mm. A diameter of a wire is, for example, about 0.8 mm to about 1.2 mm. The blade section 13 can take various shapes such as a heart shape and the like illustrated in FIG. 5 and can also take various sizes including similar figures.

The hook section 3 extends from the rear portion of the main body section 7, is bent curvilinearly in a direction in which the blade section 13 is disposed as will be described below after extending to some extent, and finally extends in an opposite direction to a direction in which the hook section 3 extends from the rear portion 6.

Figure 16:
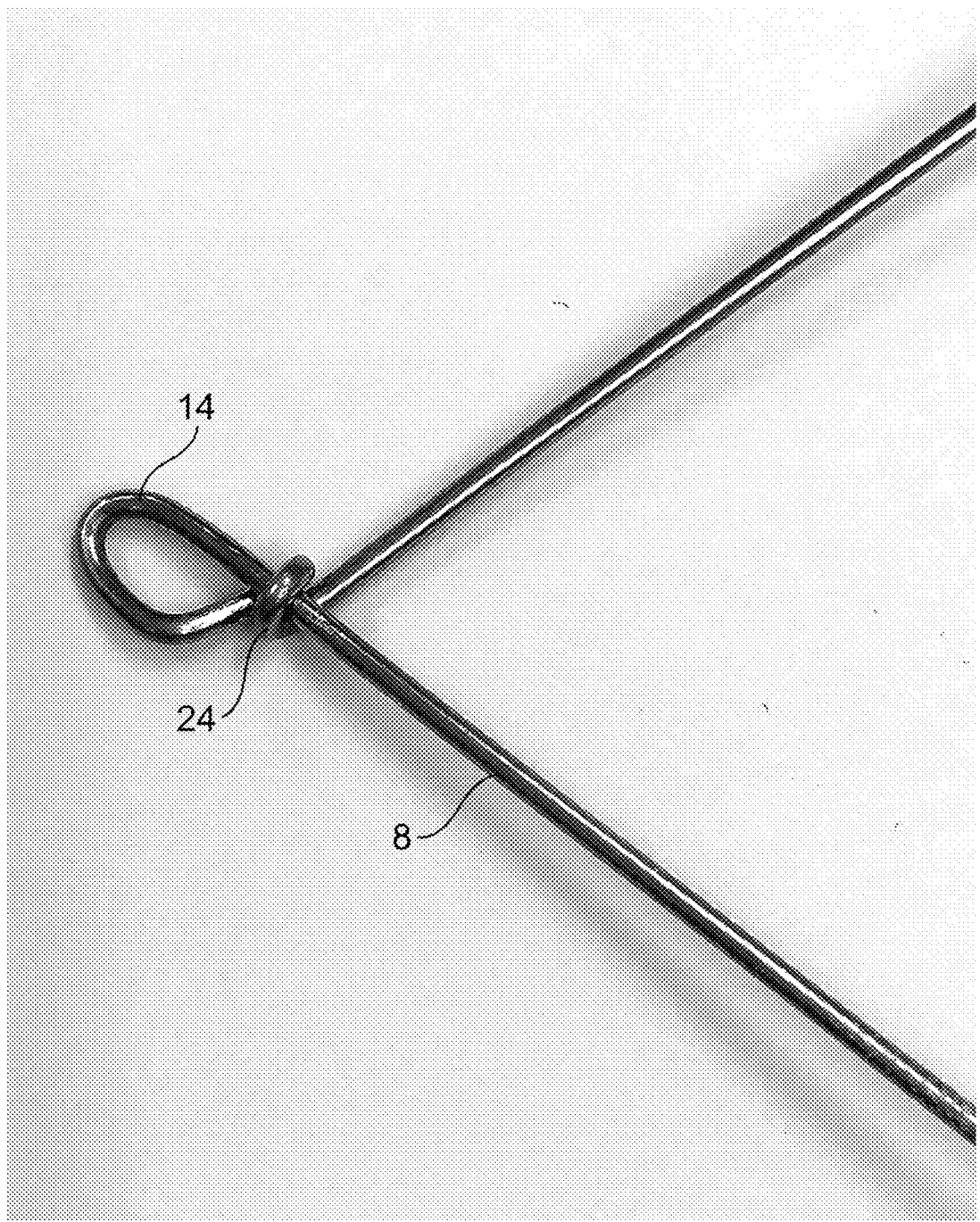
FIG. 16 is a drawing illustrating a twist portion provided at a bent portion of a wire section.

The wire section 8 penetrates through one of a plurality of holes 12 in the blade section 13 to extend to an opposite side of the blade section 13 to a side thereof which faces the main body section 7 and includes a bent portion 14 which is bent at a portion along an extension thereof. The bent portion 14 is also called a line eye, where a fishing line 17 is fastened. A split ring, not shown, may be attached to the bent portion 14 so that the fishing line 17 is attached to the bent portion 14 via the split ring. The bent portion 14 is not only bent simply but also includes a twist portion 24 formed by twisting part of the wire section 8 into a loop as illustrated in FIG. 16. As a result, a knot of the fishing line 17 can be prevented from shifting along the wire section 8.

The wire section 8 extends from the bent portion 14 through another hole of the plurality of holes 12 in the blade section to the side of the blade section 13 which faces the main body section 7, and most of the blade section 13 is situated above the main body section 7. The plurality of holes 12 may be two or more. Although the blade section 13 is penetrated at two locations by the wire section 8 as illustrated in FIG. 1, a distal end of the wire section 8 on the side of the blade section 13 which faces the main body section 7 is bent so that the wire section 8 is not dislocated from the other hole of the plurality of holes 12 for preventing the blade section 13 from falling off. An angle formed by the blade section 13 and the longitudinal shaft 5 of the main body section 7 is preferably in the range of about 80 degrees to 100 degrees, so that the fishing lure 1 can be provided which is easy to be handled and stable in operation.

When the fishing lure 1 is pulled to a front in water (for example, fresh water, sea water), the blade section 13 vibrates around the wire section 8 in such a manner that the first side portion 10 and the second side portion 11 of the blade section 13 move alternately towards the main body section 7, and the vibrating action of the blade section 13 is restricted by the wire section 8 and as a result of a portion of the blade section 13 lying near the first distal end portion 9 thereof coming into collision with the front portion 4 of the main body section 7. The blade section 13 moves in such a manner that the first side portion 10 and the second side portion 11 move alternately back and forth and also moves into an arc as illustrated (refer to FIGS. 3, 4), and as the blade section 13 moves as described above, the fishing lure 1 rolls as a pendulum does (refer to FIG. 3).

In the embodiment, the fishing lure 1 includes a skirt section 15 which is wound around the main body section 7 (refer to FIG. 1). The skirt section 15 may be made of silicone rubber.

As described above, the fishing line 17 is attached to the bent portion 14 of the wire section 8 (refer to FIG. 2).

In the embodiment, the blade section 13 includes a second distal end portion 16 which is situated opposite to the first distal end portion 9, and the width of the first distal end portion 9 is smaller than the width of the second distal end portion 16 (refer to FIG. 1).

In the embodiment, the blade section 13 includes a second distal end portion 16 which is situated opposite to the first distal end portion 9, and the width of the first distal end portion 9 is greater than the width of the second distal end portion 16.

In the embodiment, the shaft 2 of the hook section 3 extends from the rear portion 6 of the main body section 7 along the longitudinal shaft 5 of the main body section 7.

In the embodiment, the wire section 8 extends from the front portion 4 of the main body section 7 along the longitudinal shaft 5 of the main body section 7.

Figure 6:
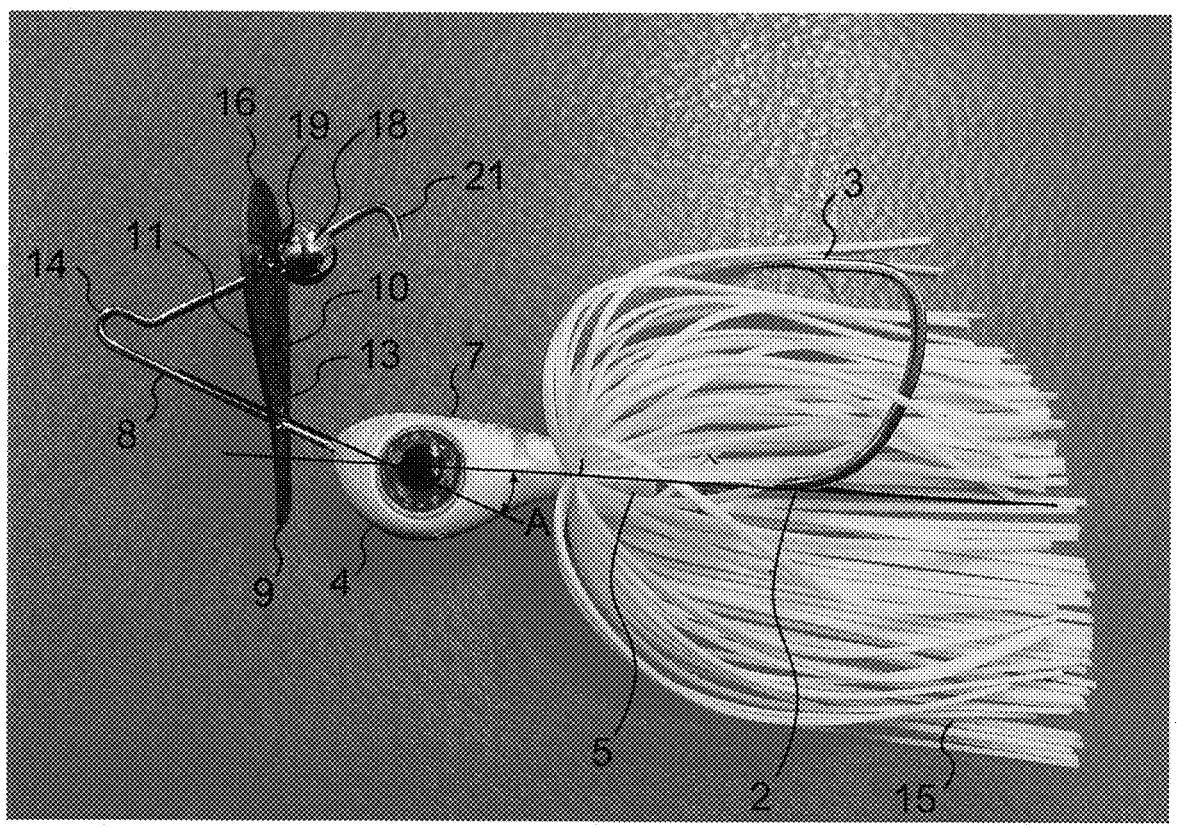
FIG. 6 is a drawing illustrating a fishing lure of the embodiment of the invention of the patent application in which a wire section is inclined relative to a longitudinal shaft of a main body section and a bead is attached to the wire section.
Figure 7:
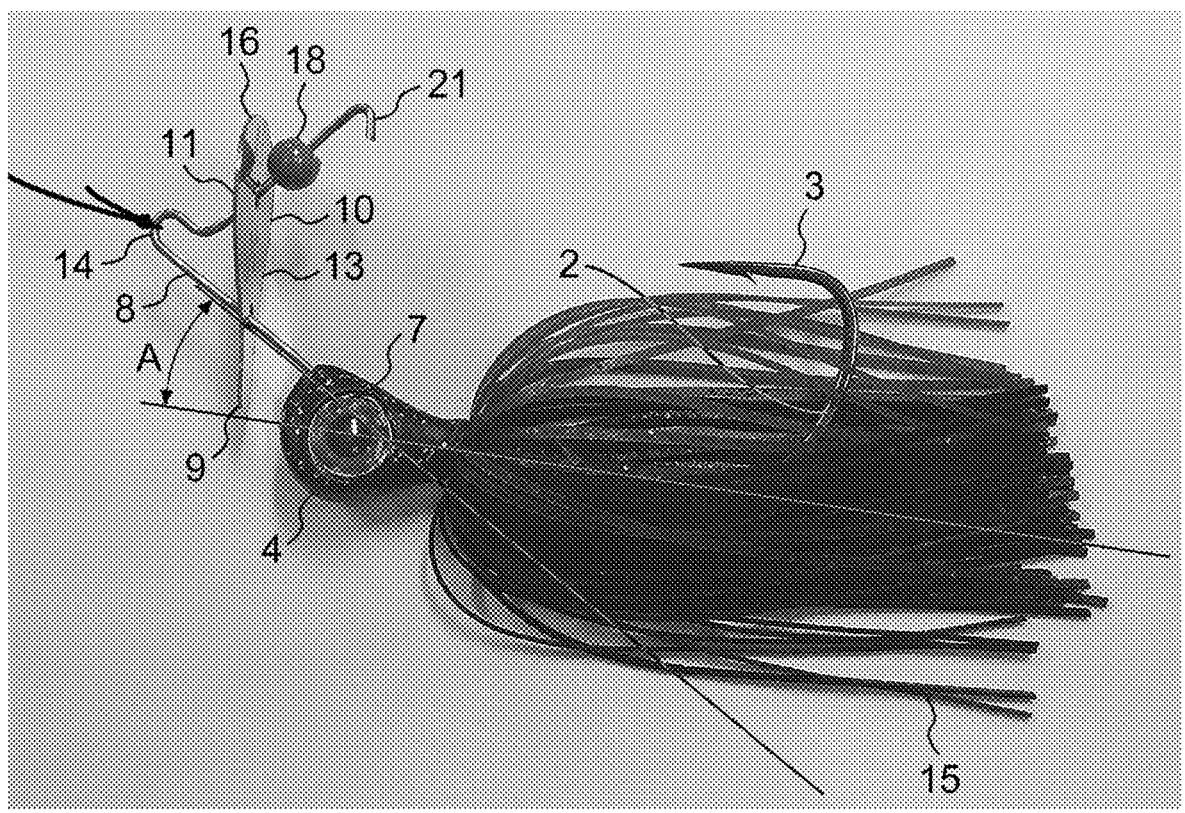
FIG. 7 is a drawing illustrating a fishing lure of the embodiment of the invention of the patent application in which an inclination angle of a wire section relative to a longitudinal shaft of a main body section is different from that of the wire section illustrated in FIG. 6.
Figure 8:
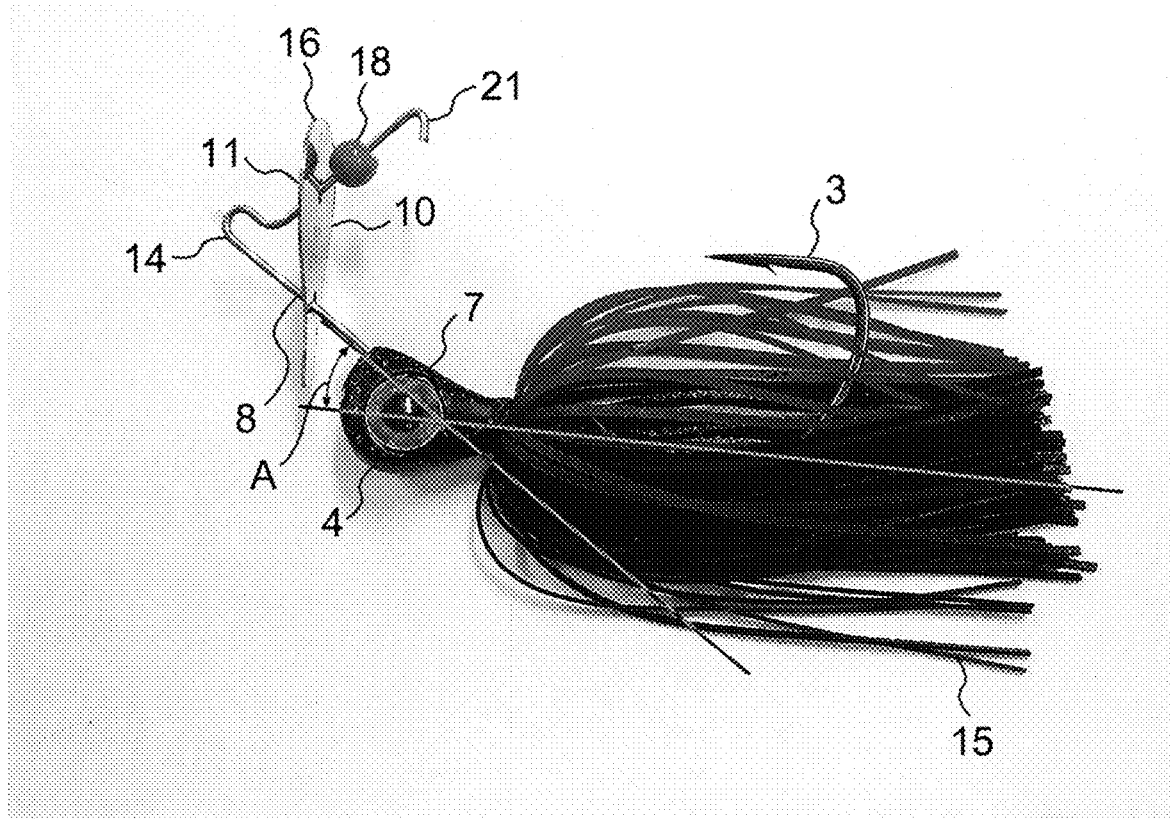
FIG. 8 is a drawing illustrating a fishing lure of the embodiment of the invention of the patent application in which an inclination angle of a wire section relative to a longitudinal shaft of a main body section is different from those of the wire sections illustrated in FIGS. 6 and 7.
Figure 9:
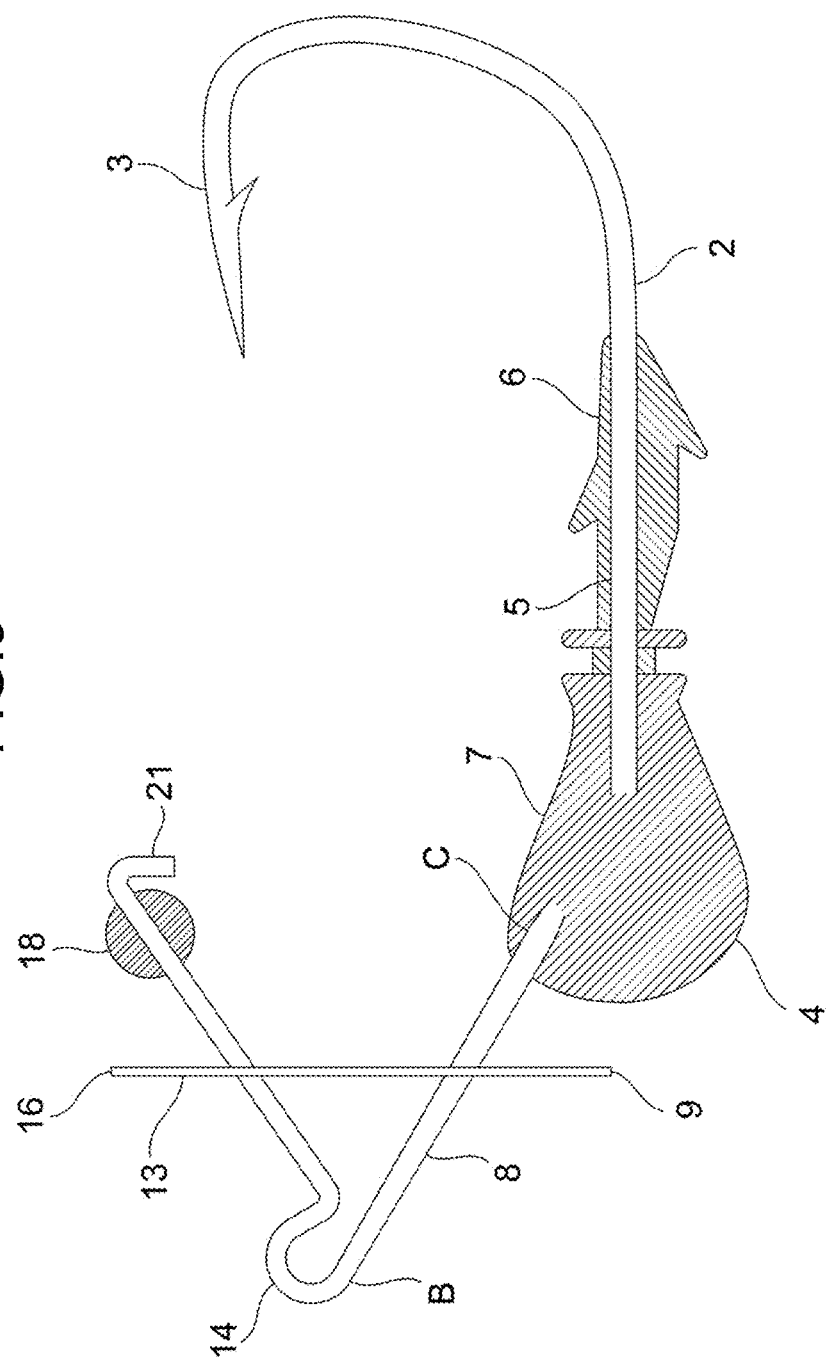
FIG. 9 is a partial cross-sectional view of a fishing lure of the embodiment of the invention of the patent application in which a wire section is tapered in such a manner that a diameter of a portion of the wire section which lies close to a front portion of a main body section is greater than a diameter of a portion which lies near a bent portion.
Figure 10:
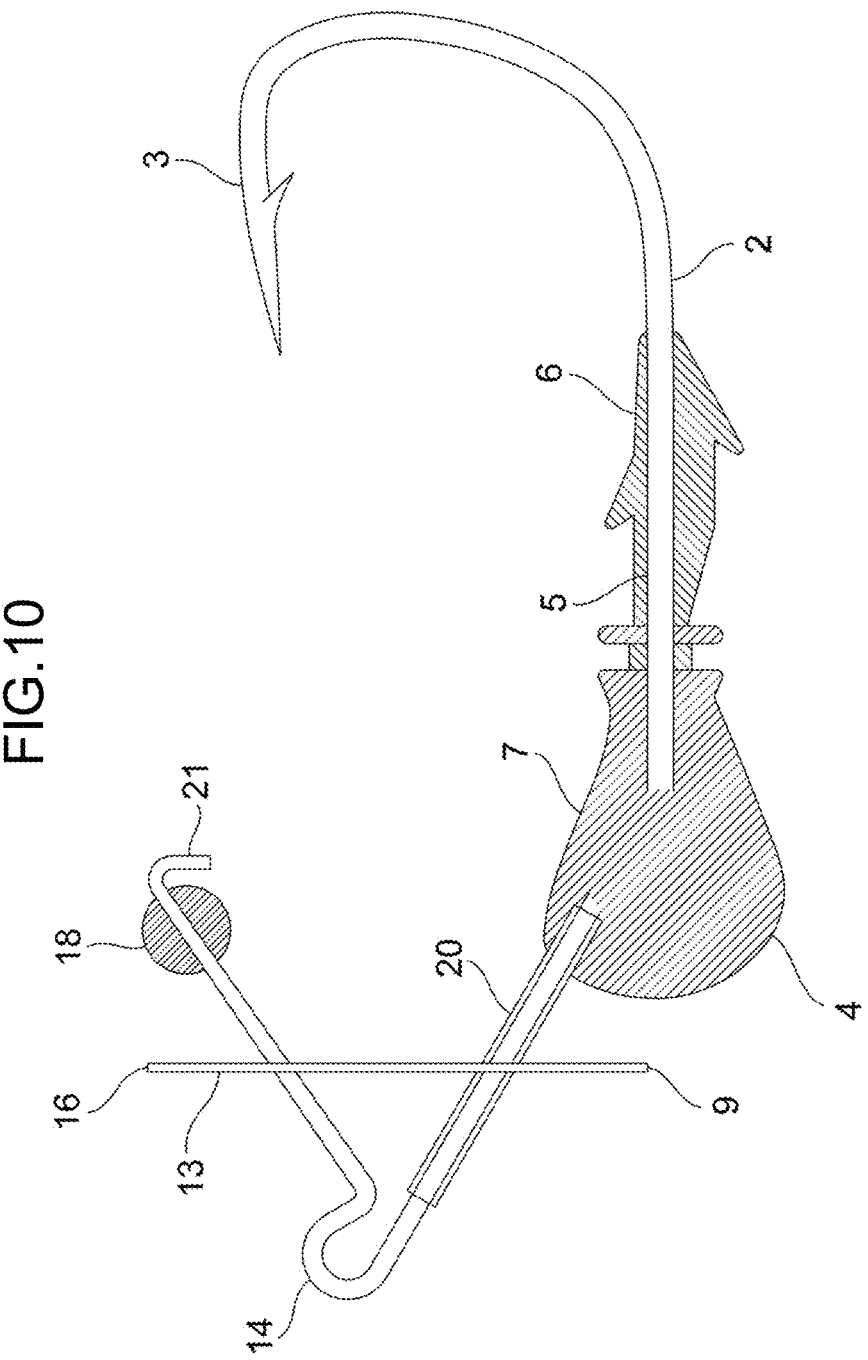
FIG. 10 is a partial cross-sectional view of a fishing lure of the embodiment of the invention of the patent application in which a wire section passes through an interior of a cylindrical member which extends from a front portion of a main body section to a vicinity of a bent portion.
Figure 11:
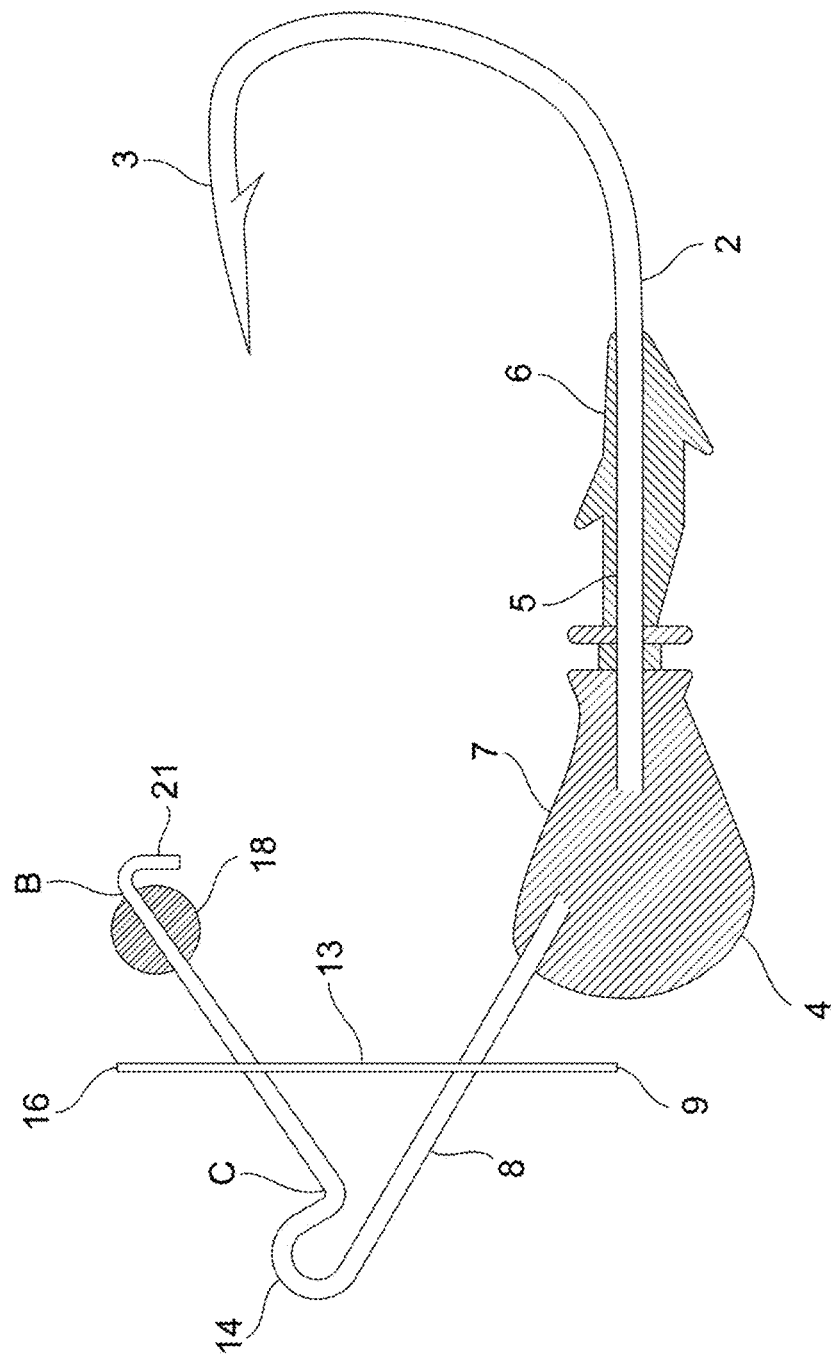
FIG. 11 is a partial cross-sectional view of a fishing lure of the embodiment of the invention of the patent application in which a wire section which extends from a bent portion through one of a plurality of holes in a blade section to a side of the blade section which faces a main body section is tapered in such a manner that a diameter of a portion lying near a bent portion is greater than a diameter of a portion which extends to the side of the blade section which faces the main body section.
Figure 12:
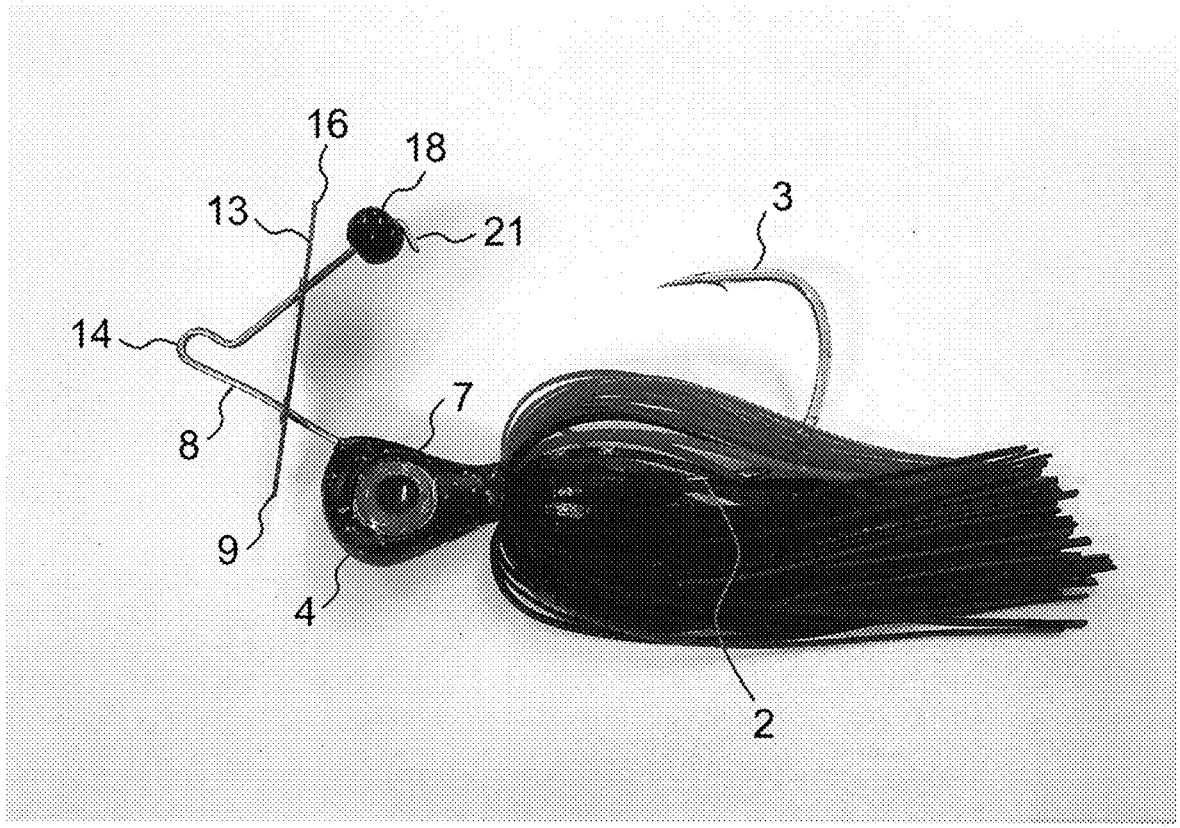
FIG. 12 is a drawing illustrating a fishing lure of the embodiment of the invention of the patent application in which a bead is fixed to a distal end of a wire section.

Next, referring to FIGS. 6 to 11, FIG. 6 is a drawing illustrating a fishing lure 1 in which a wire section 8 is inclined relative to a longitudinal shaft 5 of a main body section 7, and a bead 18 is attached to the wire section 8. FIG. 7 is a drawing illustrating a fishing lure 1 in which an inclination angle of a wire section 8 relative to a longitudinal shaft 5 of a main body section 7 differs. FIG. 8 is a drawing illustrating a fishing lure 1 in which an inclination angle of a wire section 8 relative to a longitudinal shaft 5 of a main body section 7 differs further. FIG. 9 is a drawing illustrating a fishing lure 1 in which a diameter of a portion of a wire section 8 is tapered. FIG. 10 is a drawing illustrating a fishing lure 1 in which a wire section 8 is disposed in such a manner as to penetrate through an interior of a cylindrical member 20. FIG. 11 is a drawing illustrating a fishing lure 1 in which a diameter of a different portion of wire section is tapered.

In the embodiment, the wire section 8 extending along the longitudinal shaft 5 of the main body section 7 is inclined relative to the longitudinal shaft 5. An inclination angle A is preferably in the range of about 25 degrees to about 45 degrees. The angle is preferably set so that a height of the blade section 13 in a vertical direction to the longitudinal shaft of the main body section 7 is higher than the hook section 3. FIG. 6 illustrates the fishing lure 1 in which the inclination angle A is about 25 degrees, FIG. 7 illustrates the fishing lure 1 in which the inclination angle A is about 30 degrees, and FIG. 8 illustrates the fishing lure 1 in which the inclination angle A is about 35 degrees. As illustrated in FIGS. 6 and 7, a position of a lower hole of a plurality of holes 12 in the blade section 13 is preferably situated higher than the main body section 7.

In the embodiment, the wire section 8 is tapered in such a manner that a diameter of a portion (also, called a lower arm) lying close to the front portion 4 of the main body section 7 is greater than a diameter of a portion lying near the bent portion 14 (refer to a smaller diameter B and a greater diameter C in FIG. 9). In the embodiment, the wire section 8 extends from the bent portion 14 through another hole of the plurality of holes 12 in the blade section 13 to the side of the blade section 13 which faces the main body section 7. The wire section 8 (also, called an upper arm) is tapered in such a manner that a diameter of a portion lying near the bent portion 14 is greater than a diameter of a portion that extends to the side of the blade section 13 which faces the main body section 7 (refer to a smaller diameter B and a greater diameter C in FIG. 11).

In the embodiment, the wire section 8 passes through an interior of the cylindrical member 20 which extends from the front portion 4 of the main body section 7 as near as the bent portion 14. The cylindrical member 20 may be inserted into a slit provided in the front portion 4 so as to be fixed to the main body section.

Figure 13:
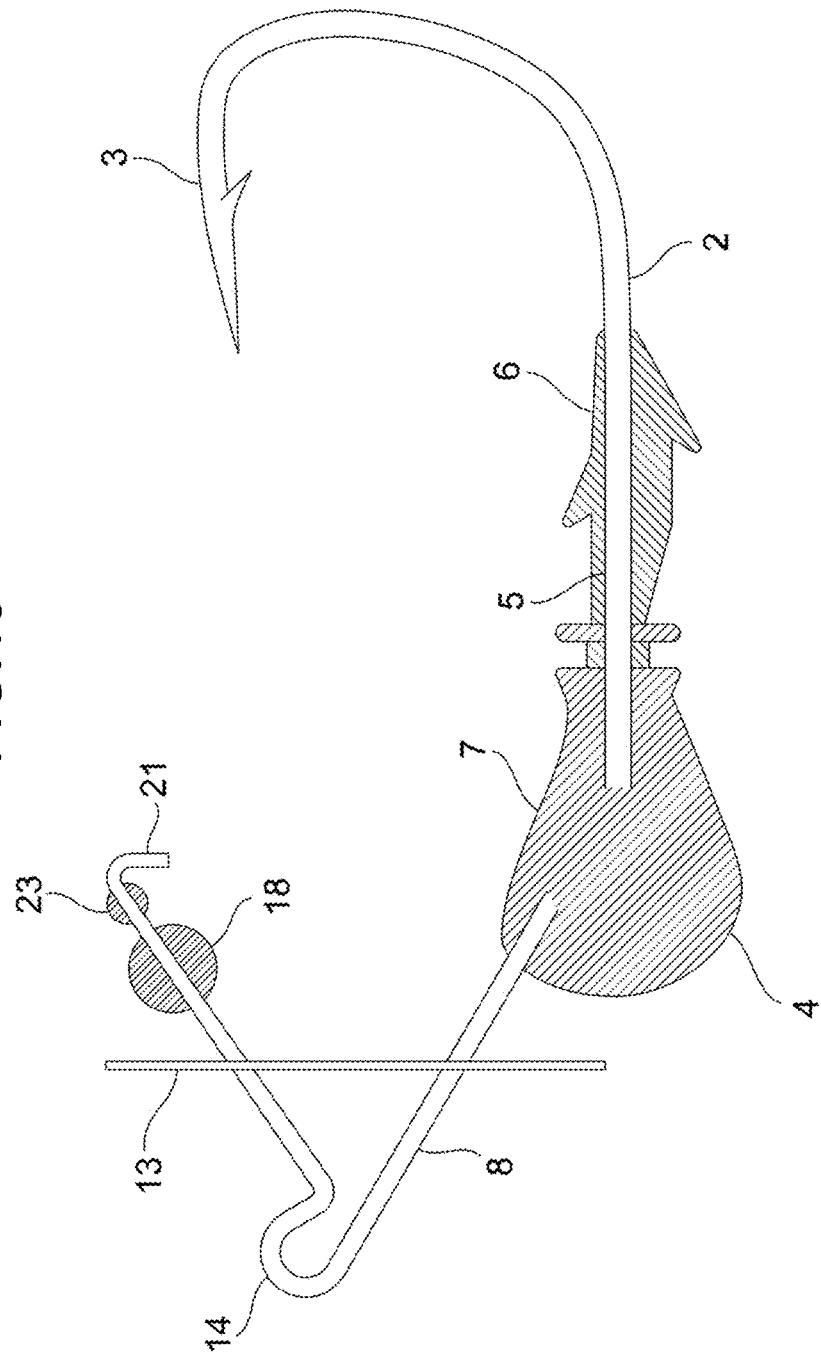
FIG. 13 is a partial cross-sectional view of a fishing lure of the embodiment of the invention of the patent application in which a bead is fixed to a distal end of a wire section and a movable bead is inserted between the blade section and the fixed bead.
Figure 14:
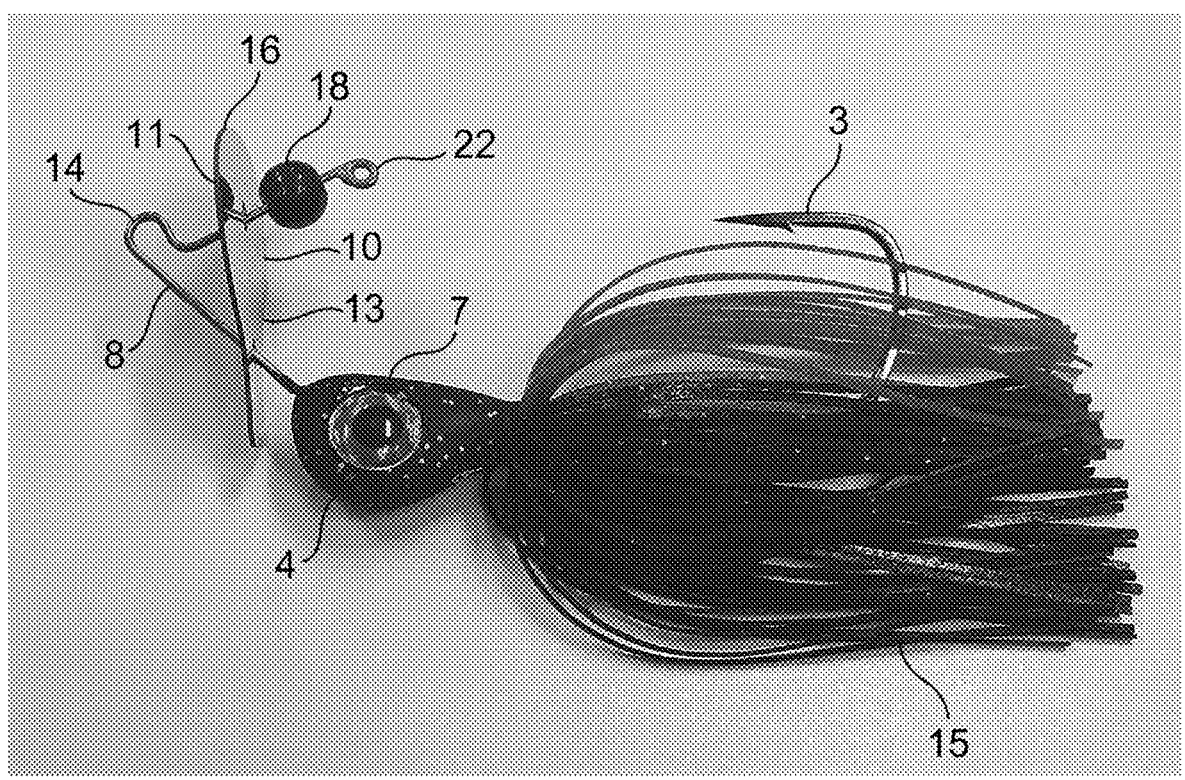
FIG. 14 is a drawing illustrating a fishing lure of the embodiment of the invention of the patent application in which a distal end of a wire section is looped.
Figure 15:
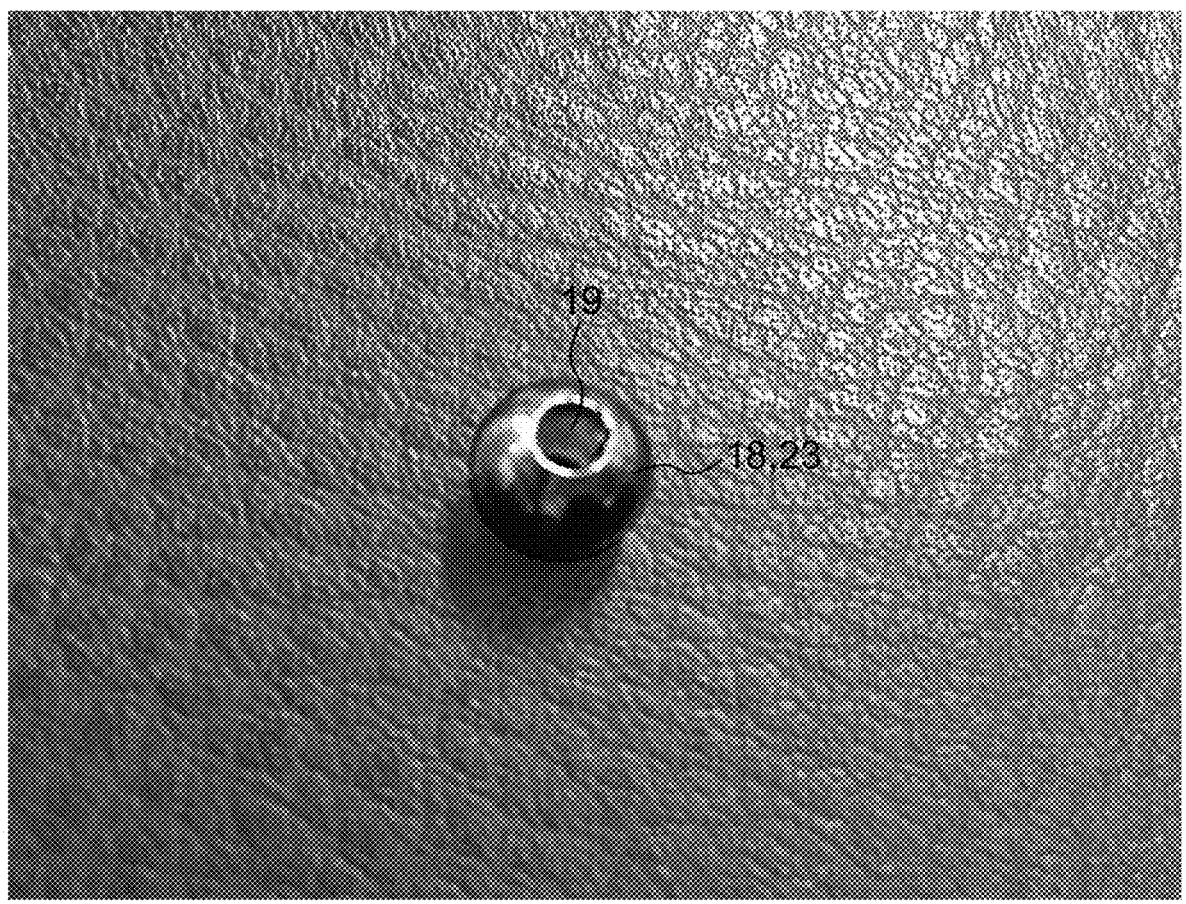
FIG. 15 is an enlarged view of beads.

Further, referring to FIGS. 12 to 15 as well as FIGS. 6 to 8, FIG. 12 is a drawing illustrating a fishing lure 1 in which a bead 23 is fixed to a distal end of a wire section 8. FIG. 13 is a drawing illustrating a fishing lure 1 in which a bead 23 is fixed to a distal end of a wire section 8, and a different movable bead 18 is inserted between a blade section 13 and the fixed bead 23. FIG. 14 is a drawing illustrating a fishing lure 1 in which a distal end of a wire section 8 is made into a loop 22. FIG. 15 is an enlarged view of the beads 18, 23.

In the embodiment, the wire section 8 extends from the bent portion 14 through another hole of the plurality of holes 12 in the blade section 13 to the side of the blade section 13 which faces the main body section 7, where the wire section 8 includes a substantially spherical bead 18 having a through hole 19 through which the wire section 8 extends for extension at a portion along the extension thereof. The bead 18 may be made of plastic or brass. A blade section 13 having an appropriate oscillation width can be provided by changing the diameter of the bead 18 in accordance with a size of a blade section 13 to be used. Although the bead 18 is not fixed to the wire section 8 in FIGS. 6 to 8, a distal end of the wire section 8 is bent so as to prevent the bead 18 from fall off the wire section 8. A bent distal end portion 21 of the wire section 8 may be curved into a loop 22 in order to prevent a user from getting injured, in order to reduce damage to a fish, and in order to prevent the fishing line 17 getting caught by the bent distal end portion 21 (refer to FIG. 15). Then, in FIG. 12, a bead 23 is fixed to the bent distal end portion 21 of the wire 8 through soldering, welding or the like. This can prevent the fixed bead 23 from falling off the wire section 8. As illustrated in FIG. 13, a different movable bead 18 may be provided on the wire section 8 between the fixed bead 23 and the blade section 13. As a result, a fish collecting effect can be enhanced by propagation of a sound wave generated as a result of the different movable bead 18 coming into collision with the blade section 13, the wire section 8, and/or the fixed bead 23 (as a result of metallic clattering or rapping sound being generated in water (for example, fresh water, sea water)). As a result, a fish collecting effect can be provided at the time of retrieving (when the fishing lure 1 is pulled) or at the time of falling (when the fishing lure 1 is caused to fall into water). The movable bead 18 is preferably smaller in size than the fixed bead 23.

A vibrating action of the blade section 13 generates propagation of a sound wave in water (for example, fresh water, sea water).

Next, a method for fabricating the fishing lure 1 will be described. Referring to FIGS. 1 to 3 again, a method for fabricating the fishing lure 1 includes a step of providing a main body section 7 having a front portion 4, a rear portion 6, and a longitudinal shaft, in which the main body section 7 includes a wire section 8 which extends from the front portion 4 of the main body section 7 along the longitudinal shaft 5 and a hook section 3 which extends from the rear portion of the main body section 7 along the longitudinal shaft 5, and the main body section 7 is fixed firmly around the wire section 8 and the hook section 3 which extend along the longitudinal shaft 5 of the main body section 7. In the embodiment, the wire section 8 is passed into a shaft 2 of the hook section 3 for connection in a mold (a metal mold) copying the main body section 7, and molten lead or the like is caused to flow into the mold. When removing a mass of lead which is set after having been cooled from the mold, an integration of a main body section 7, a wire section 8 and a hook section 3 is fabricated.

Further, the fishing lure fabrication method includes a step of providing a blade section 13 having a first distal end portion 9 which is disposed close to the front portion 4 of the main body section 7, a first side portion 10, a second side portion 11, and a plurality of holes through which the wire section penetrates.

The fishing lure fabrication method includes a step in which the wire section 8 is caused to extend through one of the plurality of holes 12 in the blade section 13 to the opposite side of the blade section 13 to the side thereof which faces the main body section 7, includes a bent portion 14 which is bent at a portion along an extension thereof, and is caused to extend from the bent portion 14 through another hole of the plurality of holes 12 in the blade section 13 to the side of the blade section 13 which faces the main body section 7, and most of the blade section 13 is situated above the main body section 7.

When the fishing lure 1 is pulled to the front in water (for example, fresh water, sea water), the blade section 13 vibrates around the wire section 8 in such a manner that the first side portion 10 and the second side portion 11 of the blade section 13 move alternately towards the main body section 7, and the vibrating action of the blade section 13 is restricted by the wire section 8 and as a result of a portion of the blade section 13 which lies near the first distal end portion 9 coming into collision with the front portion of the main body section 7.

Further, a fishing method will be described. Referring to FIGS. 1 to 3 again, a fishing method includes a step of fixing a fishing line 17 to a fishing lure 1, in which the fishing lure 1 includes a hook section 3 including a shaft 2 having a first width, a main body section 7 having a second width, a front portion 4, a rear portion 6, and a longitudinal shaft 5, a wire section 8 extending from the front portion 4 of the main body section 7, and a blade section 13 having a first distal end portion 9 which is disposed close to the front portion 4 of the main body section 7, a first side portion 10, a second side portion 11, and a plurality of through holes 12 through which the wire section 8 penetrates, the hook section 3 extends from the rear portion 6 of the main body section 7, the wire section 8 extends to the opposite side of the blade section 13 to the side thereof which faces the main body section 7, includes a bent portion 14 which is bent at a portion along an extension thereof, and extends from the bent portion 14 through another hole of the plurality of holes 12 in the blade section 13 to the side of the blade section 13 which faces the main body section 7, the fishing line 17 is attached to the bent portion 14 of the wire section 8, and most of the blade section 13 is situated above the main body section 7.

Then, the fishing method includes a step of pulling the fishing lure 1 in water (for example, fresh water, sea water), in which the blade section 13 vibrates around the wire section 8 in such a manner that the first side portion 10 and the second side portion of the blade section 13 move alternately towards the main body section 7, and the vibrating action of the blade section 13 is restricted by the wire section 8 and as a result of a portion of the blade section 13 which lies near the first distal end portion 9 coming into collision with the front portion 4 of the main body section 7. As illustrated in the figures, the blade section 13 moves in such a manner that the first side portion 10 and the second side portion 11 move alternately back and forth and moves in an arc (refer to FIGS. 3, 4), in association with which the fishing lure 1 rolls as a pendulum does (refer to FIG. 3).

The oscillation width of the blade section 13 becomes small when the width between the first side portion 10 and the second side portion 11 of the blade section 13 is narrow, and hence, this configuration is suitable for fishing a low-active fish in low-temperature water. On the contrary, the oscillation width of the blade section 13 becomes great when the width between the first side portion 10 and the second side portion 11 of the blade section 13 is wide, and hence, this configuration is suitable for fishing a high-active fish in high-temperature water. However, when the same fishing lure 1 is used at all times, fishes get used to the fishing lure 1 so used, and hence, it is preferable that a narrow blade section 13 and a wide blade section 13 are selectively used.

Thus, while the embodiment of the invention has been described in detail with reference to the drawings, the specific configuration is not limited to this embodiment, and hence, a design change that does not depart from the spirit and scope of the invention is included in the invention.

The following is a list of reference numerals used in the specification and drawings.

1 Fishing lure
2 Shaft
3 Hook section
4 Front portion
5 Longitudinal shaft
6 Rear portion
7 Main body section
8 Wire section
9 First distal end portion
10 First side portion
11 Second side portion
12 Holes
13 Blade section
14 Bent portion
15 Skirt section
16 Second distal end portion
17 Fishing line
18 Bead
19 Through hole
20 Cylindrical member
21 Bent distal end portion
22 Loop
23 Bead
24 Twist portion
A Inclination B Small diameter
C Great diameter

What is claimed is:

1. A fishing lure comprising:
   a hook section comprising a shaft having a first width;
   a main body section having a second width, a front portion, a rear portion substantially opposite the front portion, and a longitudinal shaft;
   a wire section; and
   a blade section comprising a first distal end portion disposed close to the front portion of the main body section, a first side portion, a second side portion, a first facing side that faces toward the main body section, a second facing side that is opposite the first facing side and faces away from the main body section, a first hole, and a second hole;
   wherein:
   the hook section extends from the rear portion of the main body section;
   the wire section comprises:
      a bent portion located frontward of the second facing side of the blade section and frontward of the front portion of the main body section;
      a first portion that extends into and from the front portion of the main body section, and which passes through the first hole from the first facing side of the blade section to the bent portion;
      a second portion that extends from the bent portion and passes through the second hole from the second facing side of the blade section to an end of the wire section; and
      most of the blade section is situated above the main body section; and
   the fishing lure is configured such that when it is pulled frontward through water by fishing line attached to the bent portion, the blade section vibrates around the wire section in such a manner that the first side portion and the second side portion of the blade section move alternately towards the main body section, and a vibrating action of the blade section is restricted by the wire section and as a result of a portion of the blade section lying close to the first distal end portion thereof colliding with the front portion of the main body section.

2. The fishing lure according to claim 1, further comprising a skirt section which is wound around the main body section.

3. The fishing lure according to claim 1, wherein the wire section comprises a continuous wire, the continuous wire comprising said bent portion, said first portion, and said second portion.

4. The fishing lure according to claim 1, wherein the blade section further comprises a second distal end portion which is situated opposite to the first distal end portion, and a width of the first distal end portion is smaller than a width of the second distal end portion.

5. The fishing lure according to claim 1, wherein the blade section further comprises a second distal end portion which is situated opposite to the first distal end portion, and a width of the first distal end portion is greater than a width of the second distal end portion.

6. The fishing lure according to claim 1, wherein the shaft of the hook section extends into and from the longitudinal shaft of the main body section.

7. The fishing lure according to claim 1, wherein the first portion of the wire section extends substantially parallel to the longitudinal shaft of the main body section.

8. The fishing lure according to claim 1, wherein the first portion of the wire section extends from the front portion of the main body section at an inclination angle relative to the longitudinal shaft ranging from about 25 to about 45 degrees.

9. The fishing lure according to claim 1, wherein the first portion of the wire section has a tapered diameter, such that a diameter of the first portion of the wire section situated close to the front portion of the main body section is greater than a diameter of the first portion of the wire section situated close to the bent portion.

10. The fishing lure according to claim 1, further comprising a cylindrical member, wherein the first portion of the wire section passes through an interior of the cylindrical member and the bent portion of the wire section is frontward of the cylindrical member.

11. The fishing lure according to claim 1, wherein the second portion of the wire section has a tapered diameter, such that a diameter of the second portion of the wire section between the second facing side of the blade section and the bent portion of the wire section is greater than a diameter of the second portion of the wire section between the first facing side of the blade section and the end of the wire section.

12. The fishing lure according to claim 1, further comprising a bead located rearward of the first facing side of the blade section, the bead comprising a through hole, wherein:
   the second portion of the wire section extends through the through hole; and
   the bead and blade section are configured to collide and generates sound when the fishing lure is pulled frontward through water.

13. The fishing lure according to claim 1, wherein the vibrating action of the blade section generates sound when the fishing lure is pulled frontward through water.

14. A method of fabricating a fishing lure, comprising:
   providing a main body section comprising a front portion, a rear portion substantially opposite the front portion, and a longitudinal shaft, the main body section further comprising a wire section and a hook section extending from the rear portion of the main body section along the longitudinal shaft; wherein:
      the wire section comprises a first portion, a second portion, and a bent portion between the first portion and the second portion;
      the first portion of the wire section extends into and from the front portion of the main body section to the bent portion of the wire section;
      the second portion of the wire section extends from the bent portion of the wire section to an end of the wire section;
   providing blade section, the blade section comprising a first distal end portion, a first side portion, a second side portion, a first facing side, a second facing side, a first hole, and a second hole; and
   coupling the blade section to the wire section such that:
      the first distal end portion of the blade section is located close to the front portion of the main body section;
      the first facing side of the blade section faces toward the main body section;
      the second facing side of the blade section faces away from the main body section;
      the first portion of the wire section extends through the first hole in the blade section;
      the second portion of the wire section extends through the second hole in the blade section to an end of the wire section;

the bent portion of the wire section is located frontward of the second side of the blade section and frontward of the front portion of the main body section; and most of the blade section is situated above the main body section wherein:

the fishing lure is configured such that when it is pulled frontward through water by fishing line attached to said bent portion, the blade section vibrates around the wire section in such a manner that the first side portion and the second side portion of the blade section move alternately towards the main body section, and a vibrating action of the blade section is restricted by the wire section and as a result of a portion of the blade section lying close to the first distal end portion thereof colliding with the front portion of the main body section.

15. The method according to claim 14, further comprising attaching a skirt section to the main body section.

16. The method of claim 14, wherein the blade section further comprises a second distal end portion which is situated opposite to the first distal end portion, and a width of the first distal end portion is smaller than a width of the second distal end portion.

17. The method of claim 14, wherein the blade section further comprises a second distal end portion which is situated opposite to the first distal end portion, and a width of the first distal end portion is greater than a width of the second distal end portion.

18. The method of claim 14, wherein the shaft of the hook section extends into and from the longitudinal shaft of the main body section.

19. The method of claim 14, wherein the first portion of the wire section extends substantially parallel to the longitudinal shaft of the main body section.

20. The method of claim 14, wherein the first portion of the wire section extends from the front portion of the main body section at an inclination angle relative to the longitudinal shaft ranging from about 25 to about 45 degrees.

21. The method of claim 14, wherein the first portion of the wire section has a tapered diameter, such that a diameter of the first portion of the wire section situated close to the front portion of the main body section is greater than a diameter of the first portion of the wire section situated close to the bent portion.

22. The method of claim 14, further comprising passing the first portion of the wire section through an interior of a cylindrical member, such that the bent portion of the wire section is frontward of the cylindrical member.

23. The method of claim 14, wherein the second portion of the wire section has a tapered diameter, such that a diameter of the second portion of the wire section between the second facing side of the blade section and the bent portion of the wire section is greater than a diameter of the second portion of the wire section between the first facing side of the blade section and the end of the wire section.

24. The method of claim 14, further comprising passing the second portion of the wire section through a through hole in a bead such that the bead is positioned rearward of the first facing side of the blade section, wherein the bead and blade section are configured to collide and generate sound when the fishing lure is pulled through water.

25. A method of fishing, comprising:

fixing a fishing line to a fishing lure, the fishing lure comprising:

a hook section comprising a shaft having a first width;

a main body section having a second width, a front portion, a rear portion substantially opposite the front portion, and a longitudinal shaft;

a wire section; and a blade section comprising a first distal end portion disposed close to the front portion of the main body section, a first side portion, a second side portion, a first facing side that faces toward the main body section, a second facing side that is opposite the first facing side and faces away from the main body section, a first hole, and a second hole;

wherein:

the hook section extends from the rear portion of the main body section;

the wire section comprises:

a bent portion located frontward of the second facing side of the blade section and frontward of the front portion of the main body section, the bent portion configured to couple to a fishing line;

a first portion that extends into and from the front portion of the main body section, and which passes through the first hole from the first facing side of the blade section to the bent portion;

a second portion that extends from the bent portion and passes through the second hole from the second facing side of the blade section to an end of the wire section; and most of the blade section is situated above the main body section; and fixing the fishing line to the fishing lure comprises attaching the fishing line to the bent portion of the wire section; and pulling the fishing lure frontward through water with said fishing line, during which the blade section vibrates around the wire section in such a manner that the first side portion and the second side portion of the blade section move alternately towards the main body section, and a vibrating action of the blade section is restricted by the wire section and as a result of a portion of the blade section lying close to the first distal end portion thereof colliding with the front portion of the main body section.

* * * * *